United States Patent [19]

Kawamura

[11] 4,422,661

[45] Dec. 27, 1983

[54] HEIGHT ADJUSTING SYSTEM FOR MOTORCYCLE

[75] Inventor: Sadao Kawamura, Iwata, Japan

[73] Assignee: Showa Manufacturing Co., Ltd., Tokyo, Japan

[21] Appl. No.: 235,919

[22] Filed: Feb. 19, 1981

[30] Foreign Application Priority Data

Apr. 10, 1980 [JP] Japan .................................. 55-46190

[51] Int. Cl.³ ............................................ B62K 21/02
[52] U.S. Cl. .................................. 280/276; 267/64.28;
280/279; 280/284; 280/707; 280/711
[58] Field of Search ............... 280/274, 276, 279, 284,
280/288, 707, 711; 267/64.19, 64.25, 64.26,
64.28

[56] References Cited

U.S. PATENT DOCUMENTS

| | | | |
|---|---|---|---|
| 3,854,710 | 12/1974 | Nicholls | 267/64.25 |
| 3,861,696 | 1/1975 | Gustafsson | 280/707 |
| 3,995,883 | 12/1976 | Glaze | 280/707 |
| 4,153,266 | 5/1979 | Uhls | 280/711 |
| 4,168,840 | 9/1979 | Graham | 280/707 |
| 4,212,481 | 7/1980 | Ribi | 280/276 |
| 4,310,172 | 1/1982 | Claude | 280/707 |

Primary Examiner—Bruce H. Stoner, Jr.
Assistant Examiner—John A. Carroll
Attorney, Agent, or Firm—A. W. Breiner

[57] ABSTRACT

A height adjusting system for a motorcycle body 1 comprises front and rear telescopic suspensions 2, 6 and 3, 7 respectively connected to the axles of the two wheels 4, 5 and a high pressure air tank 18 connected to the two suspensions and pressurized by an air pump 19 driven by a motor 20 supplied by a battery 23. A movable contact 25 driven by the speedometer of the motorcycle engages a fixed contact 26 when the motorcycle is either stopped or running at a low speed and completes a circuit to leak valves 10 and 11 to exhaust the suspensions 2 and 3. Electro-magnetic valves 16 and 17 also exhaust the tank 18 through check valves 14 and 15. When the motorcycle runs at a higher speed the movable contact 25 engages a second fixed contact 27 to energize the motor 20 to drive the pump 19 to pressurize the tank 18. The leak valves 10 and 11 are closed and the increase of pressure raises the motorcycle body until a predetermined level is reached when pressure responsive change-over switches 12 and 13 are operated to close the valves 16 and 17 and stop the motor 20.

6 Claims, 1 Drawing Figure

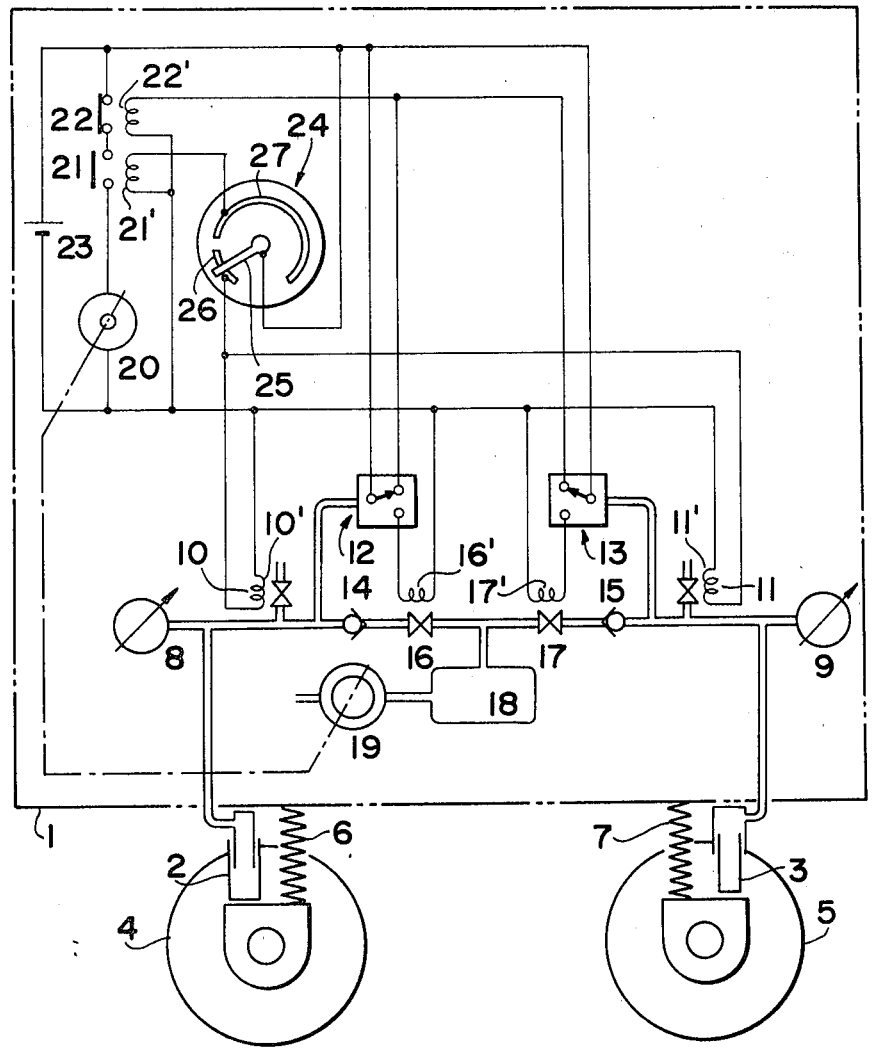

HEIGHT ADJUSTING SYSTEM FOR MOTORCYCLE

This invention relates generally to motorcycles and more particularly to a height adjusting system for use with a powerful motorcycle driven by a large capacity engine. With such a large engine beneath him a rider finds it difficult for his feet to reach the ground and the stability of the motorcycle when it either stops or runs at a low speed is reduced. This drawback may be reduced by reducing the thickness of the rider's seat, but with a corresponding sacrifice of comfort. On the other hand, if the thickness of the seat is maintained while keeping its height low, the gap between the under-side of the engine and the ground, i.e. the so-called "road clearance" is reduced. As a result, the leaning or banking angle of the motorcycle is reduced and high speed cornering becomes impossible.

The present invention is based on the principle of automatically adjusting the height of the motorcycle in accordance with the running speed and thus overcoming the drawbacks just mentioned. Thus, according to the invention front and rear telescopic suspensions each including a pneumatic shock absorbing mechanism for supporting a motorcycle body from the axles of the two wheels are connected to a high pressure gas source and means are provided for allowing gas under pressure to flow from the gas source to the two suspensions when the running speed of the motorcycle is raised, thereby increasing the height of the motorcycle. When the motorcycle stops or runs slowly the gas is released and the height of the motorcycle is lowered accordingly.

An example of a height adjusting system in accordance with the invention will now be described with reference to the accompanying drawing which is a schematic view.

The motorcycle body shown diagrammatically as 1 is suspended on the axles of front and rear wheels 4 and 5 respectively through a front fork 2 and a rear cushion formed by a pneumatic shock absorber 3. The front fork 2 and the pneumatic shock absorber 3 are telescopic, being formed as sealed cylinders constituting the shock absorbing mechanisms. The front fork 2 and the shock absorber 3 are integral with metal suspension springs 6 and 7, although shown separately for purposes of illustration.

The front fork 2 and the shock absorber 3 are respectively connected to gas pressure gauges 8 and 9, electro-magnetic leak valves 10 and 11 and pressure responding change-over switches 12 and 13 and also to a surge tank 18 by way of check valves 14 and 15 and electro-magnetic valves 16 and 17. The surge tank 18 has connected to it an air pump 19 which is driven by an electric motor 20.

The electric motor 20 is connected to a storage battery 23 through electro-magnetic switches 21 and 22. In addition a rotary switch 24 is connected to the shaft of the pointer of the speedometer of the motorcycle and has its movable contact 25 connected to one terminal of the battery 23. The leak valves 10 and 11 have their drive coils 10' and 11' connected across the battery 23 through a contact 26 which is engaged by the contact 25 when the motorcycle stops or runs at low speed.

The switch 21 has its drive coil 21' connected across the battery 23 through a fixed contact 27 which is engaged by the contact 25 when the running speed of the motorcycle is raised. On the other hand, the switch 22 has its drive coil 22' connected across the battery through one of the fixed contacts of the change-over switches 12 and 13 while the electro-magnetic valves 16 and 17 have their drive coils 16' and 17' connected across the battery 23 through the other fixed contacts of the switches 12 and 13.

The drawing shows the condition of the height adjusting system when the motorcycle is stopped or running at low speed. Under these conditions, since the contact 26 of the switch 24 is engaged by the moving contact 25, the drive coils 10' and 11' of the leak valves 10 and 11 are energised and these valves are opened so that the internal chambers of the front fork 2 and the shock absorber 3 are vented to the atmosphere. As a result, the motorcycle body 1 is supported only by the springs 6 and 7 and is held at its low level. At the same time, since the drive coils 16' and 17' of the electro-magnetic valves 16 and 17 are disconnected from the battery by the switches 12 and 13 these valves are also opened and the air in the tank 18 is discharged to the atmosphere through the check valves 14 and 15 and the leak valves 10 and 11. Since the switch 22 has its drive coil 22' connected across battery 23 through the switches 12 and 13, it is closed. On the other hand, since the switch 21 has its drive coil 21' disconnected from the battery 23 by the rotary switch 24, it is opened and the electric motor 20 is not energised.

When the running speed of the motorcycle is then raised, the movable contact 25 of the switch 24 is turned into contact with the fixed contact 27. As a result, the leak valves 10 and 11 have their drive coils 10' and 11' disconnected from the battery so that they are closed. At the same time the switch 21 has its drive coil 21' connected to the battery 23 through the contact 27 so that it is closed to start the electric motor 23. As a result the pump 19 operates to gradually boost the pressure of the air in the tank 18 which then passes through the valves 16 and 17 and the check valves 14 and 15 into the front fork 2 and the shock absorber 3 so that the motorcycle body 1 is supported not only by the forces of the springs 6 and 7 but also by the air pressure with a resultant gradual increase in the height of the motorcycle.

When the height of the front portion of the motorcycle body 1, for example, reaches a predetermined level, the pressure responsive change-over switch 12 is changed over by the prevailing pressure so that the electro-magnetic valve 16 has its drive coil 16' energised until it is closed. As a result, the pressure in the front fork 2 thereafter maintains a predetermined level so that the front portion of the body accordingly also maintains a predetermined height. On the other hand, however, the rear portion of the motorcycle body continues to rise until the pressure responding change-over switch 13 also changes over when the height reaches a further predetermined level, so that the electro-magnetic valve 17 is also closed so that the rear portion of the body also maintains a predetermined height. Moreover, when the switches 12 and 13 have both changed over, the switch 22 has its drive coil 22' de-energised so that it is opened to stop the electric motor 20.

Accordingly, since the motorcycle has its height held at a low level when it stops or runs at a low speed, the rider can easily reach the ground with his feet so as to hold the motorcycle body in a stable position. When the running speed of the motorcycle exceeds a predetermined level, the height is automatically raised and held at a suitable level. As a result, high speed cornering can be performed without difficulty and excellent riding comfort can be attained by making the seat sufficiently thick.

I claim:

1. In a motorcycle including a front and rear wheel, a front and rear axle, a body supported on said axles, and a speedometer connected to at least one of said wheels, the improvement in providing a height adjusting system for said motorcycle comprising front and rear telescopic suspensions each including a pneumatic shock absorbing mechanism, one of said mechanisms being attached at one end to the rear axle of a motorcycle and the other end being attached to the motorcycle body, and the other of said mechanisms being attached at one end to the front axle of a motorcycle and the other end to the motorcycle body thereby supporting said motorcycle body away from the said axles, a high pressure gas source connected to the said two suspensions and gas flow control means for allowing gas under pressure to flow from the said gas source to the two suspensions when the running speed of the motorcycle is raised, thereby increasing the height of the motorcycle, said gas flow control means including an air pump, a movable contact driven by the speedometer of the motorcycle, a first fixed contact engaged by the movable contact when the motorcycle is either stopped or running at a low speed, and a second fixed contact engaged by the movable contact when the motorcycle runs at a higher speed and operates said air pump supplying the high-pressure gas source.

2. The combination according to claim 1 wherein the front suspension includes a front fork and a metal spring.

3. The combination according to claim 2 wherein the rear suspension includes a pneumatic shock absorber and a metal spring.

4. The combination according to claim 3 further comprising means for stopping the flow of gas from the gas source when the pressure of the gas flowing from the gas source reaches a predetermined level.

5. The combination according to claim 4 wherein the stopping means includes a pressure-responsive switch.

6. The combination according to claim 1 further comprising a leak valve and an electro-magnetic valve, both of which connect the two suspensions to atmosphere when the first contact is engaged by the movable contact.

* * * * *